United States Patent [19]

Dugan

[11] Patent Number: 4,719,844
[45] Date of Patent: Jan. 19, 1988

[54] SHAFT ALIGNMENT SYSTEM FOR PUMPS

[75] Inventor: Larry M. Dugan, Boulder, Colo.

[73] Assignee: Adolph Coors Company, Golden, Colo.

[21] Appl. No.: 671,637

[22] Filed: Nov. 15, 1984

[51] Int. Cl.$^4$ .................. F04B 15/00; F04B 39/14; F15B 21/04; F16D 1/06

[52] U.S. Cl. .................................. 92/80; 92/82; 92/87; 92/170; 92/255; 403/13; 403/335; 403/337

[58] Field of Search .................. 92/80, 82, 84, 86.5, 92/87, 128, 170, 186, 248, 255, 256; 403/13, 14, 335, 337, 338, 344

[56] References Cited

U.S. PATENT DOCUMENTS

| 401,996 | 4/1889 | Brogden | 403/337 X |
|---|---|---|---|
| 1,538,132 | 5/1925 | Minnier | 92/255 |
| 1,964,932 | 7/1934 | Stoesling et al. | 92/87 |
| 2,295,160 | 9/1942 | Christenson | 92/255 X |
| 2,979,903 | 4/1961 | Beck | 92/255 X |
| 3,136,306 | 6/1964 | Kamm | 92/255 X |
| 3,487,897 | 1/1970 | Hahm et al. | 92/244 X |
| 3,787,125 | 1/1974 | Traut et al. | 403/13 |
| 3,818,807 | 6/1974 | Semple | 92/87 X |
| 4,004,499 | 1/1977 | Beck | 92/255 X |
| 4,023,469 | 5/1977 | Miller | 92/86.5 |
| 4,026,197 | 5/1977 | Lapke et al. | 92/186 |
| 4,033,701 | 7/1977 | Labyer et al. | 403/13 |
| 4,157,057 | 6/1979 | Bailey | 92/86.5 X |
| 4,453,454 | 6/1984 | Comer | 92/87 |
| 4,476,771 | 10/1984 | Kao | 92/87 X |
| 4,516,479 | 5/1985 | Vadasz | 92/170 |

FOREIGN PATENT DOCUMENTS

| 523688 | 4/1931 | Fed. Rep. of Germany | 403/337 |
| 26934 | of 1909 | United Kingdom | 92/82 |

OTHER PUBLICATIONS

Karassik, I. J., et al., eds. *Pump Handbook*, section 13, "Installation, Operation, and Maintenance", New York, New York: McGraw Hill Book Co., 1976, pp. 13-2 to 13-6.

*Primary Examiner*—Robert E. Garrett
*Assistant Examiner*—George Kapsalas
*Attorney, Agent, or Firm*—Klaas & Law

[57] ABSTRACT

A shaft alignment system for pumps which utilizes a clamp for holding a reciprocating shaft to a piston in an abutting relationship. The clamp can be loosened and retightened after the piston, which is attached to the reciprocating shaft, is inserted in a cylinder. Forces induced on the piston after insertion in the cylinder cause the piston and shaft to be realigned. Resecuring the reciprocating shaft assembly to the piston assembly causes the system to be precisely aligned in a transverse direction.

7 Claims, 2 Drawing Figures

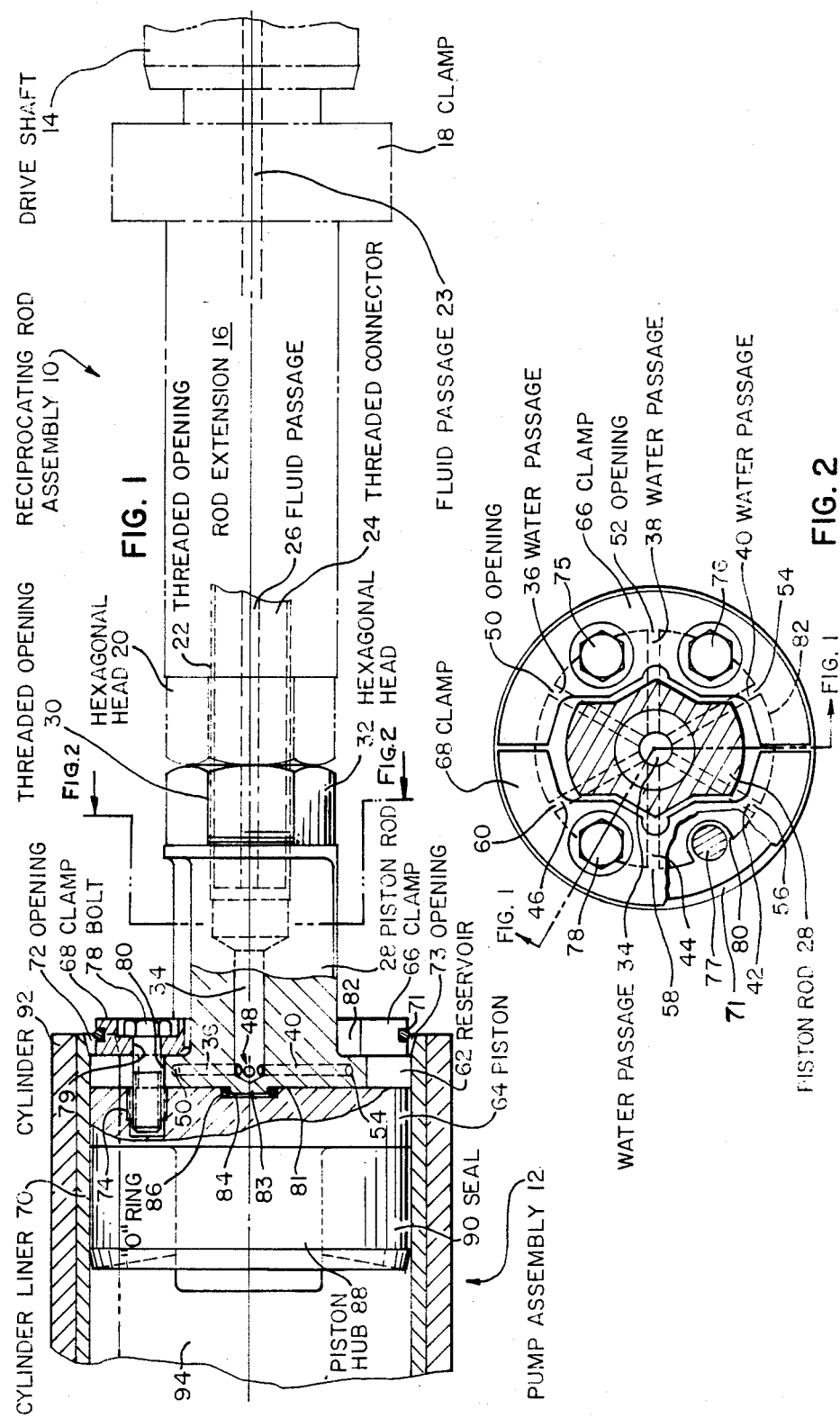

SHAFT ALIGNMENT SYSTEM FOR PUMPS

BACKGROUND OF THE INVENTION

The present invention pertains generally to machine elements and mechanisms, and more particularly to shaft alignment devices for pumps.

Various types of pumps are used for a wide range of applications. Many applications of pumps require generation of extremely high pressures to achieve a desired result. For example, mud pumps used in drilling processes are required to produce relatively large forces on the order of 4,000 lbs. per square foot to pump drilling mud a considerable vertical distance during the drilling procedure. As a result of the high pressures produced in the mud pump, considerable friction is generated as a result of the close tolerances in the reciprocating pump mechanism. These close tolerances require extremely accurate alignment of the cylinder and piston to reduce wear and increase the operating lifetime of the system. Mud pump cylinders have been designed with replaceable liners to reduce maintenance cost. Typical steel cylinder liners have an operating lifetime of approximately 1,000 hours. Additionally, replaceable seal mechanisms mounted on the piston have been designed to further reduce "down-time" and maintenance cost as disclosed in U.S. Pat. No. 4,380,951, the disclosure of which is incorporated herein by reference.

Ceramic cylinder liners, which have superior abrasion and corrosion resistance in comparison to conventional metal cylinder liners, have been developed. Such ceramic cylinder liners have expected lifetimes on the order of 5,000 hours. However, it has been found in operation that slight misalignment of the reciprocating shaft which drives the piston in the piston cylinder can cause excessive abrasion of the ceramic cylinder liner resulting in a greatly reduced operating lifetime. Hence, to employ the advantages of the ceramic cylinder liners it is necessary to very accurately align the reciprocating shaft with the cylinder. To date, it has been found to be extremely difficult, if not impossible, to align the reciprocating shaft with sufficient accuracy to take advantage of the superior qualities of the ceramic cylinder liners.

SUMMARY OF THE INVENTION

These disadvantages and limitations of the prior art have been overcome by the present invention which comprises a shaft alignment device for transversely aligning a reciprocating pump assembly to reduce wear comprising reciprocating shaft means for producing a reciprocating movement of the pump assembly; nipple means having a generally cylindrical shape disposed on an end portion of the reciprocating shaft means; piston means coupled to the reciprocating shaft means for producing a pressure differential in a cylinder to cause a pumping action; recessed means having a generally cylindrical shape disposed in an end portion of the piston means having a shape and size slightly larger than and generally aligned with the nipple means; clamp means for holding the reciprocating shaft means and the piston means in an abutting relationship with the nipple means disposed in the recessed means; connector means for inducing a pressure on said clamp means to hold the reciprocating shaft and the piston means in an abutting relationship and for releasing the pressure on said clamp means to allow realignment of the reciprocating shaft means and the piston means to precisely align the piston means in the cylinder.

The present invention may also comprise a method of aligning a reciprocating shaft assembly with a pump assembly comprising: securing the reciprocating shaft assembly to a piston assembly of the pump assembly; inserting the piston assembly in a cylinder of the pump assembly; cycling the piston assembly in the cylinder assembly; releasing the shaft assembly and the piston assembly to allow forces produced on the piston assembly and the shaft assembly as a result of misalignment to shift the relative positions of the shaft assembly and the piston assembly in a direction transverse to the direction of reciprocal movement of the piston assembly and the reciprocating shaft assembly; re-securing the reciprocating shaft assembly to the piston assembly such that the shaft assembly and the piston assembly are transversely aligned with the cylinder assembly.

The present invention may also comprise a method of aligning a reciprocating shaft means with piston means of a pump assembly in a direction transverse to a reciprocating movement of the reciprocating shaft means comprising the steps of inducing a pressure between abutting surfaces of the reciprocating shaft assembly and the piston means sufficient to secure the reciprocating shaft means to the piston means in a first position; cycling the piston means in the pump assembly for at least one cycle to position said piston means in the pump assembly; releasing the pressure between the abutting surfaces of the reciprocating shaft assembly and said piston means to allow said abutting surfaces to shift in the direction transverse to the reciprocating movement as a result of forces produced on the abutting surfaces in the transverse direction from transverse misalignment of the shaft means and the pump assembly; inducing a pressure between the abutting surfaces after the abutting surfaces have shifted from the first position to secure reciprocating shaft means to the piston means in a second position which is aligned with the pump assembly.

Hence, the present invention is capable of aligning a reciprocating shaft with a piston to prevent excessive wear as a result of misalignment. This is accomplished in a simple and easy manner by providing a releasable clamp device which allow readjustment for precise alignment. The clamp device also provides a reservoir area for cooling fluids to accumulate to aid in cooling and flushing of the cylinder liner.

OBJECTS OF THE INVENTION

It is therefore an object of the present invention to provide an improved shaft alignment device.

It is also an object of the present invention to provide an improved shaft alignment device which is simple and easy to operate.

Another object of the present invention is to provide an improved shaft alignment device for use with pumps to minimize wear and increase operating lifetime.

Another object of the present invention is to provide a shaft alignment device for transversely aligning a reciprocating pump assembly to reduce wear.

Another object of the present invention is to provide a method of aligning a reciprocating shaft assembly with a pump assembly.

Another object of the present invention is to provide a method of aligning a reciprocating shaft means with piston means of a pump assembly in a direction transverse to a reciprocating movement of said reciprocating shaft means.

Additional objects, advantages, and novel features of the invention are set forth in part in the description which follows and will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings wherein:

FIG. 1 is an elevation cut-away view of the device of the present invention.

FIG. 2 is an end cross-sectional view of the device illustrated in FIG. 1.

DETAILED DESCRIPTION OF THE INVENTION

FIG. 1 is a elevation cut-away view of the device of the present invention. FIG. 1 illustrates a reciprocating rod assembly 10 and pump assembly 12. Reciprocating rod assembly 10 includes a shaft 14 which is operatively coupled to a mud pump reciprocating motor assembly (not shown) to provide a reciprocal motion in shaft 14 which is coupled to rod extension 16 by way of clamp 18. Rod extension 16 has a hexagonal head 20 formed thereon to allow application of a rotational force on rod extension 16. A threaded opening 22 is also formed in rod extension 16 to allow threaded connector 24 to be disposed therein. Fluid passage 23 provides for the flow of cooling fluid such as water through shaft 14 and rod extension 16 from a pressurized source (not shown). Fluid passage 23 is operatively connected to fluid passage 26 in threaded connector 24 to allow passage of cooling fluid from rod extension 16 to piston rod 28. Piston rod 28 also has a threaded opening 30 to which threaded connector 24 is connected to couple piston rod 28 to rod extension 16. Hexagonal head 32 is formed on the end of piston rod 28 to allow tightening of piston rod 28 on threaded connector 24 such that the end portion of hexagonal head 32 abuts against the end portion of hexagonal head 20. Fluid passage 26 is coupled to fluid passage 34 formed in piston rod 28. Fluid passage 34 is operatively connected to a plurality of water passages 36, 38, 40, 42, 44, 46, FIG. 2, by a plurality of openings 48, FIG. 1. In a similar manner, openings 50, 52, 54, 56, 58, 60 connect water passages 36, 38, 40, 42, 44, 46 to reservoir 62. Reservoir 62 comprises an annular chamber portion between piston 64 and semi-annular end clamps 66 and 68 located between ceramic cylinder liner 70 and piston rod 28, as illustrated in FIG. 1. An O-ring member 71 is mounted on the outer periphery of end plate clamp members 66, 68 which have radially opposite gaps therebetween and have inner peripheral surface configurations generally corresponding to the cross-sectional configuration of piston rod 28 as to provide inner peripheral gaps therebetween as shown in FIG. 2. The end of liner 70 is beveled to provide openings 72, 73. Piston 64 has four bolt holes, with threaded locking sleeve inserts 74, in which threaded end portions of four bolts 75, 76, 77, 78 are disposed. Bolts 75, 76, 77, 78 slidably extend through openings 79, FIG. 1, in clamps 66, 68 and enlarged semi-circular openings 80, FIG. 2, formed in the periphery of a flange portion 82 of piston rod 28. Flange portion 82 of piston rod 28 is held between end clamp members 66, 68 and piston 64 by engagement with overlapping portions of clamps 66, 68 which exert a force on the abutting faces of piston 64 and piston rod 28 to induce a pressure at interface 81 sufficient to hold piston 64 and piston rod 28 together, without slipping, during operation of the pump assembly 12. The abutting surfaces of piston 64 and piston rod 28 are formed so that sufficient friction exists as a result of the induced pressure on interface 81 to hold the abutting surfaces together without slipping. The end of piston rod 28 has an alignment means in the form of a nipple portion 83 which extends into an annular recess portion 84 of piston 64. An O-ring centering means 86 is disposed in the recess portion 84 to provide a resilient compressible seating means for nipple portion 83. An elongated piston hub portion 88 supports a sealing ring means 90 made of a resilient material such as rubber or elastomer which sealably engages tightly cylinder liner 70. Cylinder liner 70 is supported by an outer cylinder 92 formed from a metal type material such as steel or cast iron.

In operation, drive 14 is driven in a reciprocal manner by a mud pump drive motor which causes a reciprocating motion of rod extension 16, piston rod 28, piston 64, and seal 90 between a retracted position and an extended position in cylinders 70, 92 which causes a pressure to be produced within the pump chamber 94 to pump mud during drilling. The entire piston assembly, including rod extension 16, piston rod 28, piston 64, and seal 90 are assembled on a bench prior to insertion within the cylinder liner 70. During assembly of the piston rod 28 and piston 64 the spacing between piston rod 28 and clamps 66, 68 is visually aligned by the person assembling the device. This ensures that adequate spacing is provided between bolts 75, 76, 77, 78 and the semi-circular opening 80 of the flange portion 82 of piston rod 28. The assembly is then inserted within the pump assembly and cycled several times to ensure that the piston assembly has been fully seated within pump assembly 12. The four bolts 75, 76, 77, 78, are then loosened to release the pressure on interface 81 between the abutting surfaces of piston rod 28 and piston 64 to allow piston rod 28 to universally shift transversely in any direction normal to the axis of cylinder 92. The bolts are then retightened in the newly realigned position to induce a pressure between the abutting surfaces of piston rod 28 and piston 64 at interface 81. This holds piston rod 28 and piston 64 in the new properly aligned position. The resiliency of O-ring 86 enables adjusting movement of nipple 83 within recess 84 while also functioning to center piston rod 28 relative to piston 64.

Consequently, the piston and piston rod can be assembled with initial concentric orientation on the bench. Precise realignment of the piston rod 28 relative to piston 64 occurs by loosening bolts 75–78 and allowing relative movement between piston 64 and piston rod 28 to a realigned position in response to forces produced as a result of any misalignment. Bolts 75, 76, 77, 78 are retightened in the realigned position. This results in a very exact alignment in the transverse direction. This precise alignment greatly reduces wear of cylinder liner 70 and piston ring assembly 90 as a result of transverse misalignment, which is the most prevalent misalignment of drive shaft 14 and rod extension 16 with cylinder 92. This significantly increases the operating lifetime of pump assembly 12 and cylinder liner 70.

Clamps 66 and 68 are constructed and arranged relative to piston 64 and piston rod 28 to form a partially closed reservoir 62 into which water flows from water passages 36, 38, 40, 42, 44, 46 and is collected therein rather than being simply ejected through openings 50, 52, 54, 56, 58, 60 and impinging directly upon cylinder liners 70 at six discreet locations and immediately being axially outwardly discharged. In this manner a sheath of water is formed in reservoir 62 which cycles in a reciprocal manner with piston 64 to both flush and cool cylinder liner 70. This also significantly increases the operating lifetime of seal 90 by reducing the operating temperature of cylinder liner 70 so as to increase the wear characteristics of seal 90. The reservoir openings are sized to restrict the flow of cooling water from reservoir 62 sufficiently to ensure that a sheath of cooling fluid is maintained in reservoir 62 while enabling removal of mud particles.

O-ring 71 is placed around clamps 66, 68 to align clamps 66, 68 in an inward direction during assembly of the device on the bench and prevents the clamps 66, 68 from touching cylinder liner 70.

Consequently, the present invention provides a shaft alignment device which provides a very precise manner of transversely aligning a piston in a cylinder. This is accomplished in a simple and easy manner by providing a releasable clamp which can be retightened in an assembled condition to minimize transverse alignment errors. Additionally, the clamp restricts the flow of cooling fluid from reservoir 62 to maintain sufficient fluid in reservoir 62 to uniformly cool and flush the cylinder liner during operation so as to further increase operating lifetime of the components of the system.

The foregoing description of the invention has been presented for purposes of illustration and description. It is not intended to be exhaustive or limit the invention to the precise form disclosed and other modifications and variations may be possible in light of the above teachings. For example, the present invention may be used as an alignment device for pump assemblies other than mud pumps, and essentially in any reciprocating shaft pump assembly wherein precise transverse alignment is required. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An alignment system for properly aligning a piston rod and piston operating in a cylinder comprising:
   a cylinder having a cylindrical inner surface;
   a piston positioned for reciprocating movement in said cylinder;
   said piston having a body having a cylindrical outer surface, an inner end surface having a generally planar surface and an outer end surface having a generally planar surface;
   said outer end surface having a plurality of openings therein having threaded fastening means in each of said openings;
   a piston rod for imparting said reciprocating movement to said piston;
   said piston rod terminating in a generally cylindrical flange portion having a generally planar end surface for engagement with said generally planar outer end surface of said piston;
   said flange portion having a diameter less than the diameter of said generally planar outer end surface of said piston rod;
   clamping means comprising a pair of semi-circular plate means having a combined diameter greater than said diameter of said flange portion but less than said diameter of said generally planar surface of said piston and mounted to have portions thereof in contact with said flange portion and located so that said flange portion lies between said clamping means and said generally planar outer end surface of said piston so as to space said clamping means a distance from said generally planar outer end surface of said piston;
   a plurality of openings in each of said semi-circular plate means;
   a plurality of bolts, each having an enlarged head, a generally cylindrical stem and a threaded end, passing through said openings in said semi-circular plate means and threadedly engaged with said threaded fastening means in said openings in said outer end surface of said piston;
   said bolts being tightened to apply pressure to said flange portion to urge said generally planar end surface of said flange portion into contact with said generally planar outer end surface of said piston so as to prevent relative movement therebetween;
   said flange portion having a plurality of spaced apart semi-circular openings in its circumferential surface; and
   each of said semi-circular openings having a diameter greater than the diameter of said stem of each of said bolts so as to permit relative transverse movement between said generally planar end surface of said flange portion and said generally planar outer end surface of said piston when said bolts are loosened.

2. The device of claim 1 wherein said cylinder comprises:
   ceramic cylinder liner means disposed within said reciprocating pump assembly which is capable of operating for extended periods.

3. The invention as defined in claim 2 and further comprising:
   said clamping means, said flange, said generally planar surface of said piston and said cylindrical inner surface of said cylinder form a reservoir means for collecting cooling fluid to form a sheath of cooling fluid for uniformly cooling and flushing said ceramic cylinder liner;
   means for supplying said reservoir with said cooling fluid; and
   an opening in said clamping means to provide for flow of fluid out of said reservoir.

4. A pump assembly for pumping an abrasive material such as mud during a drilling operation and comprising:
   a cylinder means having a cylindrical pumping chamber defined by a cylindrical inner surface;
   a piston means having a sealing ring mounted thereon and being engageable with said cylindrical inner surface for reciprocable movement in said cylinder means;
   piston rod means operably connected to said piston means for causing reciprocable movement of said piston means;

said piston rod means terminating in a flanged portion adjacent to said piston means;

clamping means circumjacent said piston rod means and located so that said flange portion is between said clamping means and said piston means;

fastening means for causing relative movement of said clamping means toward said piston means so as to clamp said flange portion between said clamping means and said piston means so as to prevent relative movement between said flanged portion and said piston means;

said clamping means having an outer periphery; mounting means in said outer periphery;

an annular member mounted in said mounting means and in contact with said outer periphery and said cylindrical inner surface;

fluid inlet passage means in said piston rod means for supplying cooling and flushing fluid to said cylindrical inner surface during reciprocable movement of said piston means;

an annular fluid chamber means formed by said flanged portion of said piston rod means, said piston, said clamping means, said annular member and said cylindrical inner surface of said cylinder means for holding a ring of cooling and flushing fluid therebetween during reciprocable movement with the outer peripheral surface of the ring of cooling and flushing fluid in contact with said cylindrical inner surface of said cylinder means; and flow restricting outlet passage means comprising radially opposite gaps between said clamping means opening into said annular fluid chamber means for enabling restricted flow of cooling and flushing fluid from said annular fluid chamber means at a rate sufficient to maintain a volume of cooling and flushing fluid in said annular fluid chamber means sufficient to establish fluid contact with said cylindrical inner surface of said cylinder means.

5. The invention as defined in claim 4 and wherein said clamping means comprises:

a pair of semi-circular plate means mounted circumjacent said piston rod means for radially adjustable movement relative thereto and having axially facing abutment surface means for releasably engaging said piston rod means;

axially spaced abutment means on said piston rod means for abutting engagement with said piston means and said plate means; and bolt means for adjustable fixedly connecting said semi-circular plate means to said piston rod means and to said piston means in a plurality of variable radially displaced locations.

6. The invention as defined in claim 5 wherein said annular member comprises:

an O-ring means.

7. The invention as defined in claim 6 and wherein said cylinder means comprises:

an outer cylindrical support member; and an inner cylindrical member made of ceramic material.

* * * * *